(12) United States Patent
Wolf et al.

(10) Patent No.: US 7,367,140 B2
(45) Date of Patent: May 6, 2008

(54) METHOD OF DRYING MOLDS AND APPARATUS FOR SUPPLYING DRYING AIR

(75) Inventors: Michael Wolf, Darmstadt (DE); Bernhard Seiferling, Goldbach (DE); Axel Heinrich, Aschaffenburg (DE); Peter Hagmann, Erlenbach am Main (DE); Thomas Richter, Haltern am See (DE)

(73) Assignee: Novartis AG, Basel (CH)

( * ) Notice: Subject to any disclaimer, the term of this patent is extended or adjusted under 35 U.S.C. 154(b) by 48 days.

(21) Appl. No.: 11/295,321

(22) Filed: Dec. 6, 2005

(65) Prior Publication Data

US 2006/0117591 A1 Jun. 8, 2006

(51) Int. Cl.
*F26B 3/00* (2006.01)

(52) U.S. Cl. .......................... 34/446; 34/201; 264/1.1; 134/59; 118/620

(58) Field of Classification Search ............... 34/446, 34/201; 244/1.1, 1.38; 134/59; 118/620; 264/1.1

See application file for complete search history.

(56) References Cited

U.S. PATENT DOCUMENTS

| | | | | |
|---|---|---|---|---|
| 3,801,387 A | * | 4/1974 | Goffredo et al. ............... 216/92 |
| 4,135,803 A | * | 1/1979 | Van Houwelingen ....... 396/574 |
| 4,704,348 A | * | 11/1987 | Koizumi et al. ............. 430/327 |
| 5,176,319 A | * | 1/1993 | Esmond et al. ............... 239/2.1 |
| 5,699,983 A | * | 12/1997 | Ellsworth ................ 244/118.5 |
| 5,762,081 A | * | 6/1998 | Keene et al. .................. 134/59 |
| 6,058,624 A | * | 5/2000 | Bach et al. .................... 34/374 |
| 6,511,311 B1 | | 1/2003 | Popps ...................... 425/451.9 |
| 6,811,805 B2 | * | 11/2004 | Gilliard et al. ............... 427/2.1 |
| 2002/0114084 A1 | | 8/2002 | Summersgill ............... 359/742 |

FOREIGN PATENT DOCUMENTS

| | | |
|---|---|---|
| EP | 1 566 250 A1 | 10/2003 |
| GB | 909880 | 11/1962 |
| WO | WO 98/42497 | 10/1998 |

* cited by examiner

*Primary Examiner*—S. Gravini
(74) *Attorney, Agent, or Firm*—Sheng-Hsin Hu

(57) ABSTRACT

In a method of drying molds or mold parts for the manufacture of optical lenses, in particular ophthalmic lenses and especially contact lenses, the mold or mold part to be dried is exposed to drying air. For this purpose, humid pressurized air (T) is used to which the mold or mold part is exposed.

16 Claims, 4 Drawing Sheets

METHOD OF DRYING MOLDS AND APPARATUS FOR SUPPLYING DRYING AIR

This application claims the benefit under 35 U.S.C. 119 (a)-(d) or (f) or 365 (b) of European Patent Application No. EP 04028828.4 filed Dec. 6, 2004, which is also the priority document.

The invention relates to a method of drying molds or mold parts for the manufacture of optical lenses and an apparatus for supplying drying air according to the preamble of the independent patent claim.

In the manufacture of so-called single-use contact lenses the molds or mold parts, e.g. mold halves, are re-used in the manufacturing process after manufacture and demolding of a contact lens. In this, a plurality of male mold halves can be arranged in one half of a suitable tool, for example, and a corresponding number of female mold halves can be arranged in the other half of this tool. A cyclic manufacturing process for the manufacture of such single-use contact lenses is described, for example, in WO-A-98/42497.

Prior to a re-use in the next cycle the mold halves have to be cleaned and dried, which is performed such that they are sprayed with water and subsequently exposed to dry pressurized air, by way of example. It has turned out, however, that with an increasing number of re-uses of the mold halves the contact lenses adhere more strongly to the mold halves and the automatic loosening of the contact lens from the mold half is rendered more difficult and may even affect the quality of the contact lenses. On the other hand, these mold halves are high precision components and are also expensive components both from a manufacturing point of view and with regard to the costs, so that the edge life of the mold halves must be as long as ever possible. At the same time, a high quality of the contact lenses must be ensured.

According to the invention a method is suggested as it is characterized by the features of the respective independent method claim, as well as an apparatus as it is characterized by the features of the independent apparatus claim. Advantageous variants of the method and further embodiments of the apparatus can be gathered from the features of the dependent claims.

In particular, in accordance with the invention it is suggested that for the exposure of the mold or of the mold part (e.g. mold half) humid pressurized air is used as drying air, so that no complete drying of the surface of the respective mold half occurs. Rather, droplets which may originate from the cleaning and which adhere to the surface of the mold half should be removed from the mold half. A slightly welted surface of the mold half positively affects both the loosening of the manufactured contact lenses from the respective surface of the mold half as well as a constant high quality of the contact lenses manufactured therewith.

The relative humidity of the humid pressurized air may be in the range of 45%-95%, more particular in the range of 60% to 80%, and most particular in the range of 65%-70%. This does especially advantageously affect the edge life and the quality of the contact lenses.

In an advantageous variant of the method according to the invention the humid pressurized air is generated such that a liquid, in particular water, is introduced into essentially dry pressurized air. Frequently, pressurized air supplied in industrial facilities is dry pressurized air (relative humidity is close to zero or in the range of a few percent) which is then humidified so that generally the available technical pressurized air can be used and it is not necessary to separately supply a second "type" of technical pressurized air (namely humid pressurized air).

In accordance with a further development of this variant of the method this may be performed such that for the introduction of the liquid into the essentially dry pressurized air an apparatus is used having a humidifying chamber, into which the essentially dry pressurized air is caused to flow, as well as two-component spraying nozzles with which fine liquid droplets are generated and introduced into the essentially dry pressurized air that has been caused to flow into the humidifying chamber. Thus it is efficiently possible to generate humid pressurized air. It is important that the liquid droplets introduced are fine droplets (droplet size in the range of some μm up to some ten μm) so that they can be absorbed well by the air.

It has turned out to be advantageous, in accordance with one variant of the method according to the invention, to introduce the liquid droplets into the essentially dry pressurized air into the humidifying chamber in counterflow.

In a further variant of the method the volume of the humidifying chamber is smaller than the volume of pressurized air to be humidified flowing through the humidifying chamber per second. By this, an expensive closed-loop control of the volumetric flow of pressurized air or atomizing air can be dispensed with, an open-loop control is sufficient. In case the water supply is continued during an interruption of the manufacturing process or is stopped only after some time, the relative humidity of the air in the humidifying chamber then is about 100% and any additional water supplied can no longer be absorbed by the saturated air contained in the humidifying chamber and is therefore drawn away through a drain for the liquid. As the manufacturing process is resumed again, the outlet for the drying air must only be opened for a short period of time. Because of the high volumetric flow the desired relative humidity is re-established within a very short time.

In a further advantageous variant of the method according to the invention the relative humidity of the drying air is measured so as to be able to increase or decrease the volume of introduced water, if necessary. For this purpose, a closed-loop control of the volume of water must then be possible, while only an open-loop control for the drying air is needed.

Preferably, in addition to the relative humidity also the temperature of the drying air is measured. This is advantageous inasmuch as the absolute humidity depends on the temperature, so that e.g. at a lower temperature only less water can be absorbed by the air. A sensor which is able to measure both the relative humidity and the temperature can be used for this purpose.

According to the invention an apparatus is suggested for supplying (humid) drying air for the drying of molds or molds parts for the manufacture of optical lenses, particularly of ophthalmic lenses and especially contact lenses, which comprises an inlet for the inflow of essentially dry pressurized air into a humidifying chamber. In addition, the apparatus comprises means for introducing fine liquid droplets, particularly water droplets, into the essentially dry pressurized air introduced into the humidifying chamber. Thus, the drying air required as humid pressurized air can be generated, which can then be provided through an outlet of the apparatus.

In an embodiment of the apparatus according to the invention two-component spray nozzles are provided for introducing the liquid droplets into the pressurized air introduced into the humidifying chamber, with the aid of which the desired fine droplets can be generated which can be especially well absorbed by the pressurized air (see above).

An apparatus can be particularly suitable, in which the inlet for the essentially dry pressurized air, the two-component spray nozzles for introducing the liquid droplets into the pressurized air introduced into the humidifying chamber, and the outlet for the drying air are arranged such, that the liquid droplets are introduced in counterflow into the pressurized air flowing in the through the humidifying chamber, and the thus humidified pressurized air then reaches the outlet.

Also, it can be particularly advantageous when the inlet for the essentially dry pressurized air is arranged at the lower end of the humidifying chamber, and when the two-component spray nozzles are arranged such that they spray the liquid droplets in the downward direction into the upwardly flowing pressurized air. At the lower end of the humidifying chamber a drain for the liquid is provided. The atomized fine droplets falling down can be absorbed by the upwardly flowing dry pressurized air, while coarse droplets fall down and reach the drain for the liquid and can be drawn away.

According to a further embodiment of the apparatus according to the invention an aerosol trap can be arranged in the direction of the flow after the means for introducing the liquid droplets into the essentially dry pressurized air or after the two-component spraying nozzles respectively, in order to separate droplets which may still be present in the pressurized air since they have not been completely absorbed.

As already mentioned upon explaining the method, according to a further embodiment of the apparatus according to the invention, the volume of the humidifying chamber can be smaller than the mean volume per second of pressurized air to be humidified flowing through it. By this, after an interruption of the manufacture of the contact lenses even when the water continues to flow into the humidifying chamber and the relative humidity is about 100%, upon resuming the manufacture of the contact lenses it is rapidly possible to again provide drying air having the desired relative humidity (see above).

Finally, a humidity sensor for measuring of the relative humidity of the drying air can be arranged close to the outlet for the drying air, and in addition there may be provided a temperature sensor for measuring the temperature of the drying air, and in particular the humidity sensor can also be executed as a temperature sensor.

Further advantageous aspects of the method according to the invention or of the apparatus according to the invention become clear from the following description of embodiments with the aid of the drawing, in which.

Figure 2:
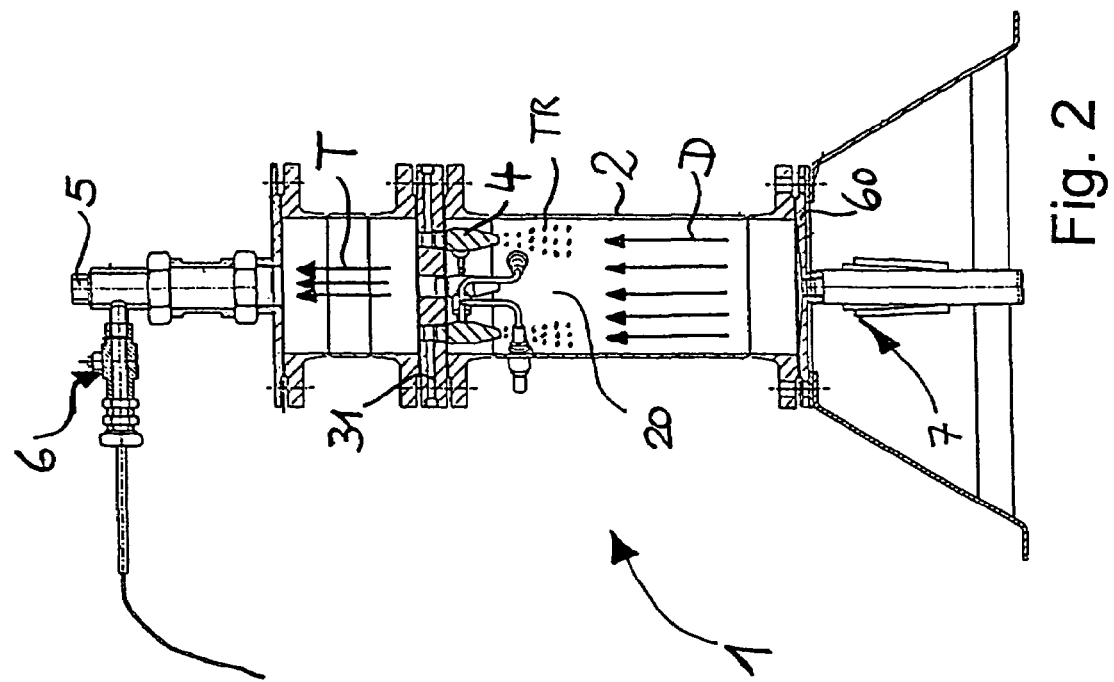
FIG. 2 shows a longitudinal cross-section through the embodiment of the apparatus of FIG. 1 according to the invention
Figure 1:
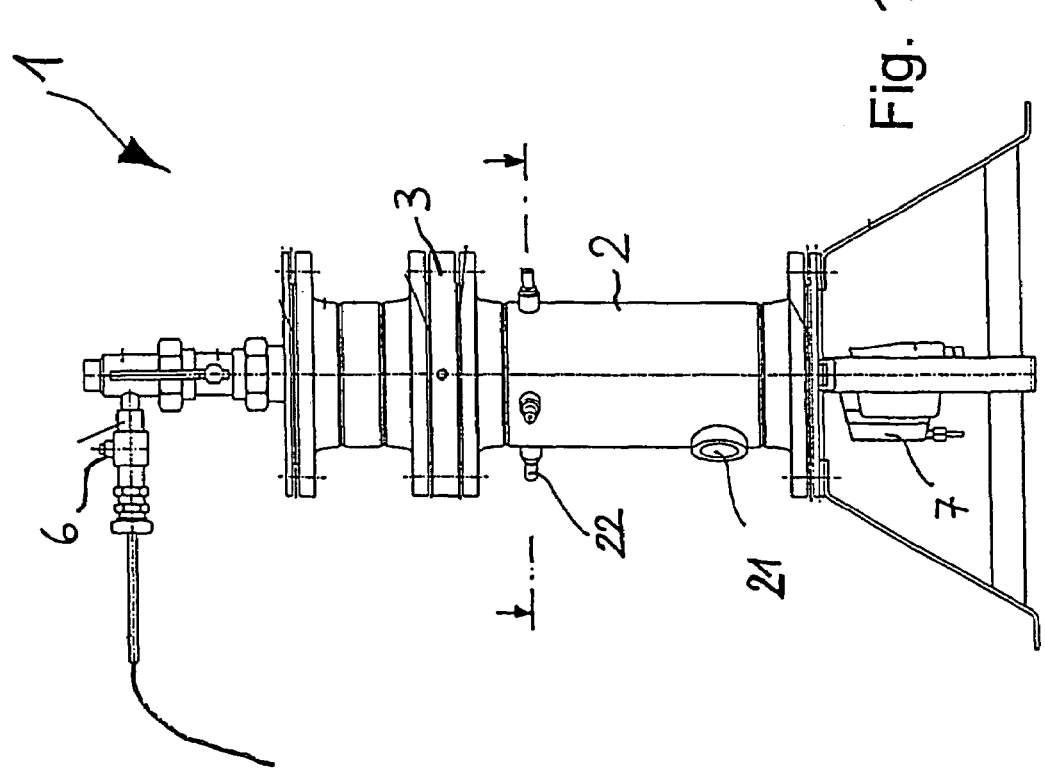
FIG. 1 shows a side view of an embodiment of the apparatus for supplying drying air according to the invention

In FIG. 1 and FIG. 2 an embodiment of an apparatus 1 for supplying humid drying air T in accordance with the invention is shown in a side view and in cross-section, respectively. In particular, a pipe 2 can be seen in which a humidifying chamber 20 is provided. At pipe 2 an inlet 21 is arranged for essentially dry pressurized air D which is introduced into the humidifying chamber 20 through the pressurized air inlet 21. The pressurized air inlet 21 is arranged in the region of the lower end of pipe 2. The relative humidity of the essentially dry pressurized air D can be practically zero or in the range of a few percent. The pressure with which the pressurized air D is introduced can be 1 bar, for example, however, it can be supplied with a different pressure, which may in particular be higher (especially with respect to the fact, that in industrial facilities pressurized air frequently is supplied having a pressure of 6 bar).

Multiple water inlets 22 are further provided at pipe 2 through which a supply of two-component spraying nozzles 4 with water can be performed (in the following for the sake of simplicity called "nozzles"), which are inserted into a nozzle plate 3. In addition to water, atomizing air is supplied, too, to the nozzles 4 through channels 31 provided in nozzle plate 3. At the outlet of the nozzles very fine droplets TR are introduced into the humidifying chamber in counterflow to the essentially dry pressurized air D. The droplets TR are absorbed by the pressurized air thus humidifying it and forming the humidified drying air T which is then provided at the outlet 5 e.g. for the drying of mold halves in the automatic manufacture of contact lenses (as has been described further above). A sensor 6, which is designed as a humidity sensor for measuring the relative humidity of the drying air T and preferably also as a temperature sensor, is arranged shortly before the outlet 5. Optionally, an aerosol filter can be arranged within the air stream before the sensor 6 for separating droplets that have not been completely absorbed but which have nevertheless been carried along by the air stream. Finally, at the lower end of pipe 2 a base plate 60 is provided being equipped at it with a drain 7 for water that has not been absorbed by the air stream.

The relative humidity of the drying air T at the outlet generally is between 45% and 95%, in particular between 60% and 80%, and especially in the range of 65% to 70%. This is achieved through the adequate supply of essentially dry pressurized air D and of the required amount of water and atomizing air to the nozzles 4. A more detailed description of the working principle will be given further below.

Figure 3:
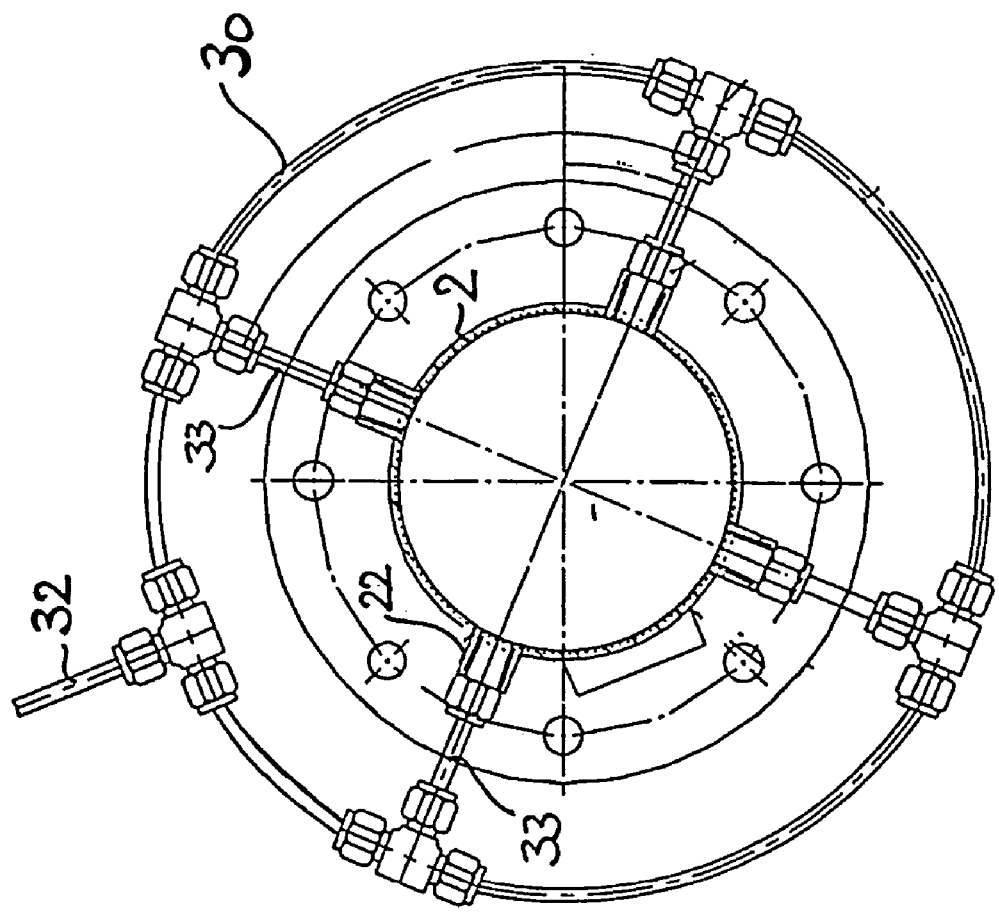
FIG. 3 shows an embodiment of the water supply to the two-component spray nozzles (cross-section along line III-III in FIG. 1)

FIG. 3 shows a cross-section through the apparatus along the line III-III in FIG. 1. When viewed together with FIG. 2 the water supply to the individual nozzles 4 becomes obvious. A ring conduit 30 having multiple T-pieces is supplied with water from a supply conduit 32. The T-pieces are connected to the individual water inlets 22 through supply conduits 33, and these in turn are connected to the nozzles 4 through respective conduits (see FIG. 2).

Figure 4:
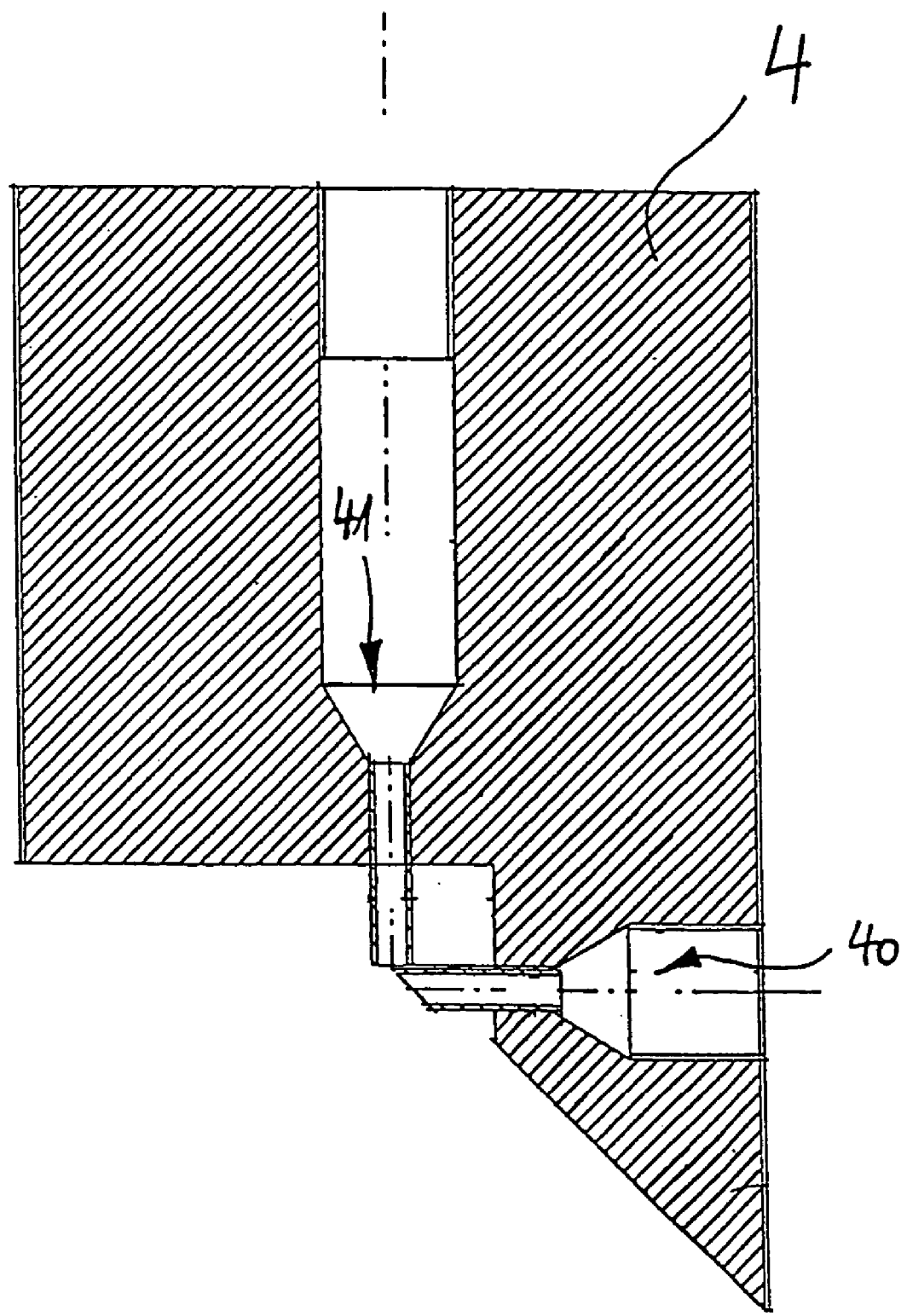
FIG. 4 shows a cross-section through a schematic representation of an embodiment of a two-component spray nozzle

A general representation of an embodiment of such a two-component spray nozzle 4 can be seen in FIG. 4. It works in accordance with the principle of a perfume atomizer. The water to be atomized (or in general a liquid to be atomized) is supplied through a water channel 40. At the outlet of water channel 40 the water is atomized by the atomizing air emerging perpendicular thereto from the end of an air channel 41 to form the fine droplets TR, which are then introduced in counterflow into the essentially dry pressurized air D (see FIG. 2) and are absorbed in the pressurized air D thus humidifying it.

Figure 5:
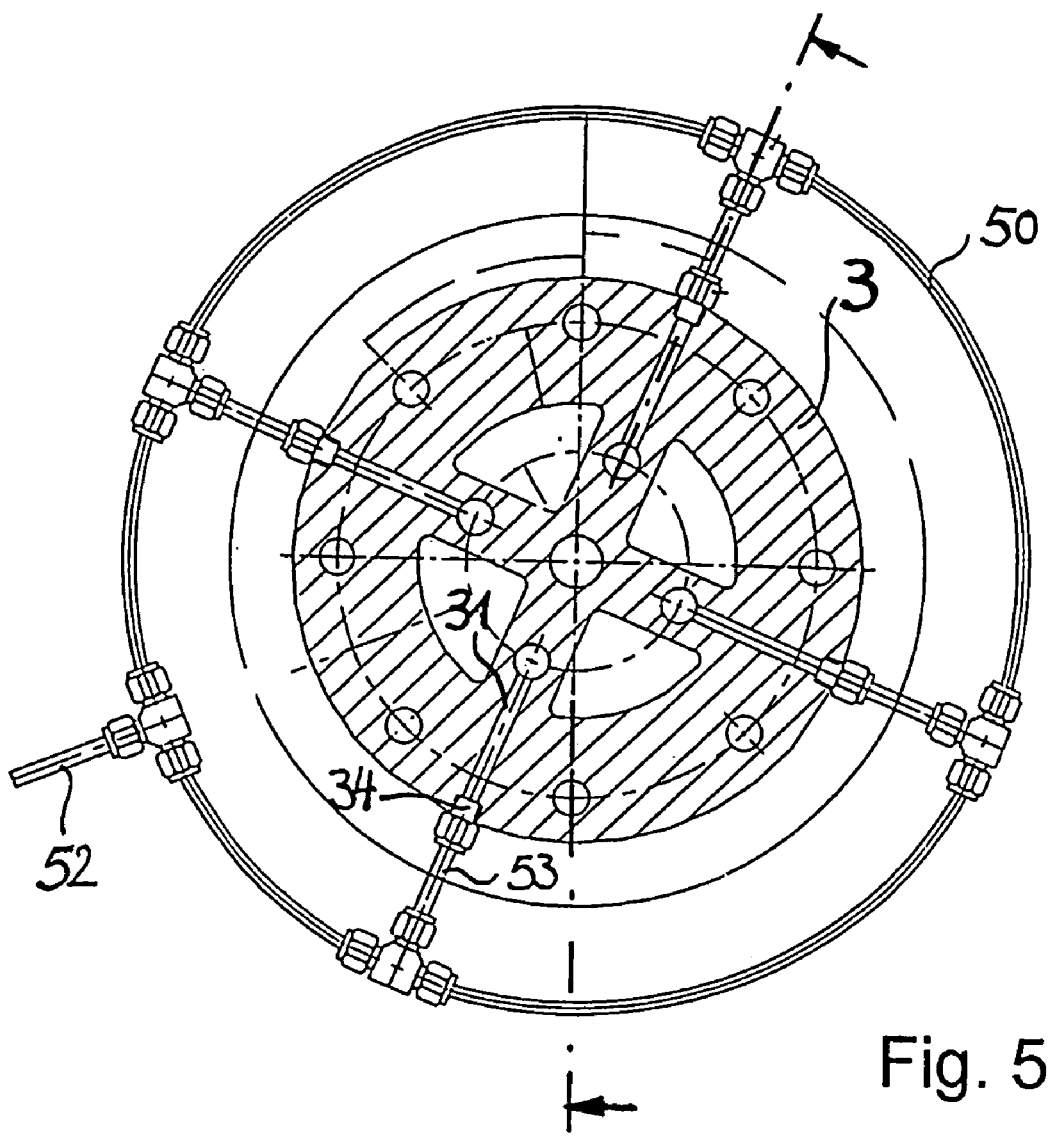
FIG. 5 shows a top view of a cross-section through the nozzle plate of the apparatus of FIG. 1, with a pressurized air supply for the two-component spray nozzles.
Figure 6:
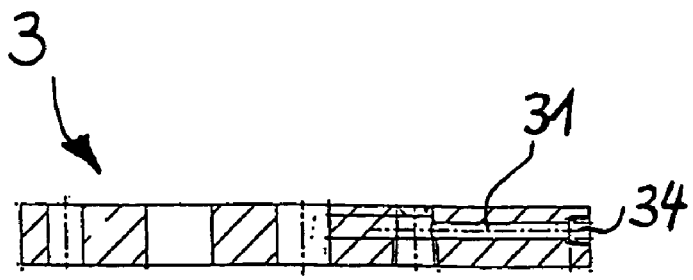
FIG. 6 shows a view of a longitudinal cross-section along line VI-VI through the nozzle plate of FIG. 5.

In FIG. 5 a top view of a cross-section through the nozzle plate 3 of the apparatus of FIG. 1 can be seen together with a supply of pressurized air to the two-component spray nozzles. The nozzle plate 3 can also be seen in FIG. 6. A ring conduit 50 having multiple T-pieces is supplied with water through a supply conduit 52. The T-pieces are connected to the individual atomizing air inlets 34 in the nozzle plate 3 through supply conduits 53, and these in turn are connected to the nozzles 4 through channels 31 (see FIG. 2).

For the humidification, essentially dry pressurized air D (having a relative humidity of e.g. 1% to 2%) is introduced through the pressurized air inlet 21 into the humidifying chamber 22, so that the direction of the flow of the pressurized air D runs from the bottom toward the top. The pressure of the pressurized air D may be about 1 bar and the introduced volume of pressurized air may be 39 m$^3$/h. A volumetric flow of (pure) water of e.g. 1.5 l/h to 2 l/h can then be supplied to the nozzles 4. At the same time, atomizing air having a pressure of e.g. 2.5 bar is supplied to the nozzles through the atomizing air inlets 34 and the channels 31. The pressure of the atomizing air in general is about 0.5 bar to 3 bar above the pressure of the essentially dry pressurized air D which is introduced into the humidifying chamber 22. The volumetric flow of the atomizing air may be about 1600 l/h, for example.

The droplets TR generated by the nozzles 4 have a mean droplet size of 15 μm and are atomized in counterflow into the air stream of the pressurized air D so that they are absorbed therein. Droplets of too large a size which are not absorbed by the air stream or which are not carried along with the air stream can be drawn away through an outlet in the base plate 60 and through drain 7 for the liquid. Droplets which are carried along with the air stream but which are not completely absorbed can be separated by an aerosol trap (not shown), which is arranged before the sensor 6 and the outlet 5 for the drying air T, so that the drying air T at the outlet 5 no longer contains any droplets.

Both the relative humidity and the temperature of the drying air T are measured by the sensor 6 close to the outlet 5. This is advantageous inasmuch as only less water can be absorbed by the air at a lower temperature of the air, of course. However, if the volumetric flow remained constant in such a case the relative humidity would increase.

In particular, the apparatus can be operated such that both the pressure and the volumetric flow of the essentially dry pressurized air D as well as the pressure and the volumetric flow of the atomizing air can be open-loop controlled while the pressure and the volumetric flow of the supplied water is closed-loop controlled. As a consequence, depending on the measured relative humidity and the temperature of the drying air T at the outlet 5, the supply of water can be closed-loop controlled such that the relative humidity of the drying air T at the outlet 5 has the desired value. For example, during operation about 80 m$^3$/h of drying air T (norm conditions) are taken out of the outlet 5.

The volume of the humidifying chamber 22 may be some liters (e.g. 5 liters). During an interruption of the manufacture of contact lenses, as the water supply is not immediately stopped or is not stopped at all the relative humidity of the air in the humidifying chamber increases to 100%, and the additional supplied water is drawn away through the outlet in the base plate 60 and through drain 7. As production of contact lenses is resumed, for a short instance only air having a relative humidity of 100% is available. However, the desired relative humidity of the drying air is rapidly re-established again at outlet 5 because of the high volumetric flow flowing through the humidifying chamber 22 per second in relation to the humidifying chamber's volume.

As already mentioned above, this is possible using a simple open-loop control (no closed-loop control) of the supply of the pressurized air and the atomizing air while only the supply of water is closed-loop controlled. The technical expense for the open-loop and closed-loop controls can thus be kept small.

The invention claimed is:

1. A method for the manufacture of optical lenses, comprising the steps of:
removing droplets adhered on molds or mold halves after cleaning the molds or mold halves, while slightly wetting the surfaces of the molds or mold halves with drying air, wherein the drying air is humid pressurized air, wherein the humid pressurized air is generated by introducing a liquid into essentially dry pressurized air, wherein the introducing a liquid into the essentially dry pressurized air using an apparatus comprising a humidifying chamber, into which the essentially dry pressurized air is caused to flow; and spraying nozzles, with which fine liquid droplets are generated and introduced into the essentially dry pressurized air which has been caused to flow into humidifying chamber.

2. A method according to claim 1, wherein the relative humidity of the humid pressurized air is in the range of 45% to 95%.

3. A method according to claim 2, wherein the relative humidity of the humid pressurized air is in the range of 60% to 80%.

4. A method according to claim 3, wherein the relative humidity of the humid pressurized air is in the range of 65% to 70%.

5. A method according to claim 1, wherein the liquid droplets are introduced in counterflow into the essentially dry air flowing into the humidifying chamber.

6. A method according to claim 1, in which the volume of the humidifying chamber is smaller than the volume of pressurized air to be humidified flowing through the humidifying chamber per second.

7. A method according to claim 1, wherein the relative humidity of the drying air is measured.

8. A method according to claim 7, wherein the temperature of the drying air is measured.

9. An apparatus for supplying drying air for removing droplets adhered on molds or mold halves after cleaning the molds or mold halves, while slightly wetting the surfaces of the molds or mold halves for the manufacture of optical lenses comprising: a humidifying chamber including an inlet for the introduction of essentially dry pressurized air into a humidifying chamber; equipped with a means for generating and dispensing fine liquid droplets into the essentially dry pressurized air introduced in the humidifying chamber so as to generate humid pressurized drying air; and an outlet for the drying air thus generated.

10. An apparatus according to claim 9, wherein the means for introducing the liquid droplets into the pressurized air introduced into the humidifying chamber are spray nozzles.

11. An apparatus according to claim 10, wherein the inlet for the essentially dry pressurized air, the spray nozzles for introducing the liquid droplets into the pressurized air introduced into the humidifying chamber, and the outlet for the drying air are arranged such that the liquid droplets are introduced into the pressurized air in counterflow, and the thus humidified pressurized air then reaches the outlet.

12. An apparatus according to claim 11, wherein the inlet for the essentially dry pressurized air is arranged at the lower end of the humidifying chamber, and wherein the spray nozzles are arranged such that they spray the liquid droplets in the downward direction into the upwardly flowing pressurized air, and wherein further a drain for the liquid is provided at the lower end of the humidifying chamber.

13. An apparatus according to claim 9, in which in the direction of the flow an aerosol trap is arranged after the means for introducing the liquid droplets into the essentially dry pressurized air or after the two-component spraying nozzles, respectively.

14. An apparatus according to claim 9, wherein the volume of the humidifying chamber is smaller than the mean volume per second of pressurized air to be humidified flowing through it.

15. An apparatus according to claim 9, wherein close to the outlet for the drying air there is arranged a humidity sensor for measuring the relative humidity of the drying air.

16. An apparatus according to claim 15, wherein further a temperature sensor is arranged for measuring the temperature of the drying air.

* * * * *